UNITED STATES PATENT OFFICE.

FRANK HENRY LAVANCHY CLARKE, OF CANNES, FRANCE.

FOOD PRODUCT AND PROCESS OF MAKING THE SAME.

No. 857,445.     Specification of Letters Patent.     Patented June 18, 1907.

Application filed January 30, 1906. Serial No. 298,707.

*To all whom it may concern:*

Be it known that I, FRANK HENRY LAVANCHY CLARKE, a citizen of Switzerland, residing at Villa Bellerive, Cannes, in the Department of Alpes Maritimes, France, manager of The Anglo-Swiss Land & Building Company (Limited), of 15 Rue de Bourg, Lausanne, Switzerland, have invented certain new and useful Improvements in Food Products and Processes of Making the Same, of which the following is a specification.

The object of this invention is to provide an alimentary product which, besides having a high nutritive value, shall be cooling and very readily digestible, so as to be specially adapted for use as a dietetic in cases of dyspepsia.

The alimentary product in question may be called "banana chocolate," being composed of triturated cocoa beans and banana flour, with the addition of milk powder and extract of malt, the ingredients of the compound being so prepared and mixed together in such proportions as to afford all the essential elements of a complete food in a concentrated form viz:—albuminous matters or proteids, fatty substances, and carbo-hydrates.

The banana flour is prepared preferably from the variety of the plant known as "*Musa sapientium*," although good results may also be obtained from the variety known as "*Musa paradisiaca.*" The fruit, having attained a sufficient degree of maturity, is deprived of its peel (which is employed as hereafter described), and the pulp is cut into strips which are dried first by exposure to the sun and afterward by being subjected to a current of hot, dry air. The dried strips are then broken and reduced to a granular form, the material being again subjected to the desiccating action of a current of hot, dry air and finally ground into flour and sifted.

In the drying process the pulp loses some part of its aroma, and in order to restore this, recourse is had to the peel which had been removed from the fruit as already mentioned. This peel may be employed either freshly gathered or preserved in alcohol, and the essential oil or concentrated essence is extracted from it preferably by distillation at a very low temperature by means of vacuum apparatus, whereby absolute purity of the essence is insured and an aroma of greater suavity and at the same time higher penetrating power is obtained than usual. The essence may be volatilized in any suitable apparatus for the purpose and brought into contact with the pulp, for example, while the latter is being subjected in granular form to the second current of hot air already mentioned, or preferably the banana flour would be sifted into a closed receptacle into which the essence is simultaneously injected in the form of vapor produced by means of suitable vaporizing apparatus.

Previous to its admixture with the cocoa, a certain proportion of dried milk powder and of pure extract of malt, is added to the banana flour.

The cocoa having been ground to the requisite fineness and without any deprivation of the fatty matter (cocoa butter) which it naturally contains, there is mixed with it the banana flour prepared as described, and when these ingredients have been thoroughly incorporated with one another, the requisite quantity of sugar for flavoring may be added.

The quantity of each of the constituents of the product may be varied, but a product consisting of the following percentage composition is found to be suitable for ordinary consumption:—

Cocoa _____ 50 parts by weight
    Banana flour ___ 10 parts
    Sugar _____ 25 parts
    Milk powder ___ 10 parts
    Malt extract __ 5 parts It is to be observed that the nitrogenous matters which exist in both the banana flour and the cocoa, are preserved in the resulting product in what may be termed their natural state, that is to say they have not been decomposed by heat nor deprived of any of their nutritive elements, it being advisable, in order to insure this, that the grinding operation should be so conducted as to avoid "fatiguing" (*i. e.* overheating and consequently overdrying) the cocoa by violent mechanical action.

Claims.

1. The herein described alimentary product of concentrated form, comprising comminuted pulp of the banana fruit; essential oil of the banana skins, milk powder, malt extract, triturated cocoa beans and sugar, substantially as specified.

2. The herein described method of manufacturing the alimentary product of concentrated form, consisting in drying and comminuting the pulp of the banana fruit, restoring the aroma lost by the pulp during its treatment by combining with it the essential oil extracted from the skins, mixing the aromatized comminuted pulp with dried milk powder and extract of malt, incorporating the mixture with triturated cocoa beans, and flavoring the product with sugar, substantially as specified.

FRANK HENRY LAVANCHY CLARKE.

Witnesses:
GIT. FABELCH,
MARC CHANTRE.